United States Patent [19]

Kaluzhsky et al.

[11] Patent Number: 4,536,216

[45] Date of Patent: Aug. 20, 1985

[54] CEMENT FOR THE MANUFACTURE OF CORES AND MOULDS AND METHOD FOR PREPARING SAME

[75] Inventors: Nikolai A. Kaluzhsky, Leningrad; Khoren A. Badaliants, Leningradskaya; Ivan M. Kostin, Leningradskaya; Isaak A. Zatulovsky, Leningradskaya; Valentin I. Korneev; Vladimir V. Andreev, both of Leningrad; Boris A. Kuzmin, Leningradskaya; Viktor M. Sizyakov, Leningrad; Nikolai S. Shmorgunenko, Leningrad; Vladislav A. Krochevsky, Leningrad; Alexei I. Alexeev, Leningrad, all of U.S.S.R.

[73] Assignee: Vsesojuzny Nauchno-Issledovatelsky I Proektny Institut Aljuminievoi, Magnievoi I Elektrodnoi Promyshlennosti, Leningrad, U.S.S.R.

[21] Appl. No.: 491,979

[22] Filed: May 5, 1983

[51] Int. Cl.³ .............................................. B28B 7/34
[52] U.S. Cl. ................................. 106/38.3; 106/38.9; 106/104
[58] Field of Search ................. 106/38.3, 104, 38.9

[56] References Cited

U.S. PATENT DOCUMENTS 2,081,558  5/1937  Prange ............................... 106/38.3
2,887,392  5/1959  Lolley et al. ....................... 106/38.3

OTHER PUBLICATIONS

Ved et al., "Physico-Chem. Principles of Technology of Steam-Cured Bldg. Mat'ls", Beedivelnik, 1966.
Shvite et al., "Calcium Hydrocarboaluminates and Hydroferrites", 1969.

Primary Examiner—Lorenzo B. Hayes
Attorney, Agent, or Firm—Ladas & Parry

[57] ABSTRACT

The cement of the invention comprises chemically combined oxides, percent by mass: CaO, 50 to 60; $Al_2O_3$, 28 to 37; $Fe_2O_3$, 0.01 to 1; $SiO_2$, 0.1 to 8; $Na_2O$, 0.1 to 1; $K_2O$, 0.1 to 0.5; $H_2O$, 3 to 12; and incorporates 85 to 99% by mass of a fraction with a particle size of below 80 $\mu$m and 1 to 15% by mass of a fraction with a particle size of from 80 to 200 $\mu$m. The cement can also contain one or more additives: calcium oxide or calcium hydroxide, calcium carbonate, calcium carboaluminate.

The method according to the invention for preparing said cement comprises a heat-treatment of calcium hydroalumosilicate containing $SiO_2$ in an amount of not more than 8% by mass at a temperature of from 250° to 600° C. The heat-treated product is disintegrated to produce 85 to 99% by mass of a fraction with a particle size of below 80 $\mu$m and 1 to 15% of a fraction with a particle size of from 80 to 200 $\mu$m.

During the heat-treatment of the hydroalumosilicate at least one component can be added calcium oxide or calcium hydroxide, calcium carbonate, calcium carboaluminate.

The cement is useful in foundry engineering for the manufacture of articles from ferrous and non-ferrous metals.

4 Claims, No Drawings

CEMENT FOR THE MANUFACTURE OF CORES AND MOULDS AND METHOD FOR PREPARING SAME

FIELD OF THE INVENTION

The present invention relates to binding materials, and more specifically to a cement for the manufacture of cores and moulds and to a method for preparing same. The cement according to the present invention is intended for the manufacture of cores and moulds in the production of castings from ferrous and non-ferrous metals in single-use sand moulds.

BACKGROUND OF THE INVENTION

Use of various inorganic binding agents such as water glass, Portland cement and the like, as well as organic type binders, e.g. synthetic resins are widely known in the manufacture of articles by casting. Despite the low cost and availability of conventional binding agents such as water glass, Portland cement, synthetic resins, they do not meet the requirements for the manufacture of articles by methods of foundry engineering.

Cold-curable mixtures based on known binding agents have the following disadvantages:

(1) on water glass: non-uniform composition, short life time and an increased residual strength after casting of cores and moulds with a molten metal which results in an impaired knocking-out of cores and moulds, i.e. extraction of castings from the moulding sand mass;

(2) on Portland cement: extended duration of hardening, impaired knocking-out;

(3) on an organic binder: increased toxicity, impaired conditions of labour for the operating personnel; furthermore, thermal sticking of sand is formed which is difficult to eliminate mechanically.

Therefore, at the present there is no cement material which would fully meet the requirements imposed on cements intended for the manufacture of cores and moulds in foundry engineering.

OBJECTS OF THE INVENTION

It is an object of the present invention to provide a cement for the manufacture of cores and moulds which would have a high mechanical strength after a short-time curing, a rapid softening after casting of metal into cores and moulds, and absence of liberated toxic products.

It is another object of the present invention to provide a method for preparing the cement which will make it possible to use available starting materials without resorting to complicated procedures or requiring high power and heat consumption.

SUMMARY OF THE INVENTION

This object is accomplished by the provision of a cement for the manufacture of cores and moulds which, according to the present invention, comprises chemically combined oxides, percent by mass: CaO, 50 to 60; $Al_2O_3$, 28 to 37; $Fe_2O_3$, 0.01 to 1; $SiO_2$, 0.1 to 8; $Na_2O$, 0.1 to 1; $K_2O$, 0.1 to 0.5; $H_2O$, 3 to 12; and has the following particle size distribution: 85 to 99% by mass of a fraction with a particle size of below 80 $\mu m$ and 1 to 15% by mass of a fraction with a particle size of from 80 to 200 $\mu m$.

The cement is a white or yellowish powder having no odour; it possesses good binding properties.

The cement of the above-mentioned compositions has a high strength during the initial period of curing reaching 12-15 MPa for one day and ensures a high mechanical strength of cores and moulds in 1-3 hours after their manufacture (up to 0.6-1 MPa) and a considerable (substantial) softening after casting of cores and moulds with a liquid metal, thus ensuring a good knocking-out (extraction) of cores and moulds.

The cement can also contain one additive or more such as calcium oxide, calcium hydroxide, calcium carbonate, calcium carboaluminate; a content of calcium oxide and/or calcium hydroxide can be 1 to 10% by mass, that of calcium carbonate 1 to 50% by mass, calcium carboaluminate 1 to 30% by mass. These additives accelerate hardening of cement and improve knocking-out of cores and moulds. In the cement there can be present impurities of magnesium compounds, however, they do not affect the cement properties.

The present invention also provides a method for preparing the above-mentioned cement, which comprises heat-treatment of calcium hydroalumosilicate containing not more than 8% by mass of $SiO_2$ at a temperature selected within the range of from 250° to 600° C. and disintegration of the heat-treatment product to obtain a fraction with a particle size of below 80 $\mu m$ in an amount of 85-99% by mass and a fraction with a particle size of from 80 to 200 $\mu m$ in an amount of 1-15% by mass.

For the heat-treatment use can be made of any calcium hydroalumosilicate containing silica in an amount of not more than 8%. This is due to the fact that the content of silica in calcium hydroalumosilicate of more than 8% by mass results in lowered mechanical strength properties of the cement and, consequently, in reduced mechanical strength of cores and moulds.

The heat-treatment of calcium hydroalumosilicate can be carried out in the presence of one or several additives: calcium oxide, calcium hydroxide, calcium carbonate, calcium hydrocarboaluminate; the content of calcium oxide and/or calcium hydroxide can be within the range of from 1 to 10% by mass, calcium carbonate 1 to 50% by mass, calcium hydrocarboaluminate 1.5 to 30% by mass.

These additives accelerate hardening of cement and reduce the residual strength of cores and moulds after casting thereof with a metal, i.e. they increase their softening necessary for the extraction of castings from the sand mass. The additives can be introduced directly into the final hydroalumosilicate and then subjected to a heat-treatment or they can be synthesized during the preparation of hydroalumosilicate.

As seen from the description, the process according to the present invention is simple and can be readily implemented on a commercial scale.

All the components employed for the production of the cement are readily available and inexpensive.

Calcium hydroalumosilicate is a known compound and can be synthesized from aluminate solutions by treatment thereof with lime. Aluminate solutions are produced in processing of bauxites or nephelines and other similar rocks into alumina. Furthermore, calcium hydroalumosilicate can be synthesized from calcium oxide or calcium hydroxide, sodium aluminate or sodium hydroaluminate upon their interaction with aqueous solutions of sodium carbonate.

The cement for the manufacture of cores and moulds according to the present invention ensures the following advantages as compared to known cements used for the same purpose:

it features a good knocking-out ability of mixtures due to a low value of the residual strength after casting of cores and moulds with a metal (not more than 0.3 MPa), mixtures spontaneously pour out by 50 to 75% on a knock-out grid;

cores and moulds manufactured with the use of the cement show a high compression strength which is equal to:

| after 1.5 hours | 0.3–0.5 MPa |
|---|---|
| after 3.0 hours | 0.6–1.0 MPa |
| after 24 hours | 1.5–2.0 MPa; | it has no toxic products evolved during the manufacture of cores and moulds, as well as during casting thereof with metal;

it has a low thermal sticking of sand on castings which is easily removed in the subsequent snagging. The thermal sticking of sand hinders the formation of a mechanical sand sticking and gaps characteristic for mixtures based on an organic binder.

DETAILED DESCRIPTION OF THE INVENTION

A detailed description of the cement composition and the method for preparing same is given below.

As a raw material use is made of an alkali metal aluminate or hydroxyaluminate with a content of 4 to 10% by mass of $SiO_2$ and calcium oxide which are intermixed in a weight ratio of 1:1–1.5:1. The resulting mixture is treated with an aqueous solution of an alkali metal carbonate having a concentration of 3–5% by mass. The treatment is carried out at a temperature of from 25° to 95° C. for a period of time necessary to ensure accumulation of 20–100% of calcium hydroalumosilicate in the solid phase. In addition to calcium hydroalumosilicate, the thus-obtained product may also include calcium oxide or calcium hydroxide, calcium carbonate and calcium hydrocarboaluminate. These compounds are formed during the process depending on its duration. The suspension resulting from the treatment is separated on filters such as band-type ones and the solid phase is exempted from alkalis by washing. The thus-obtained calcium hydroalumosilicate contains 0.1–7% by mass of $SiO_2$.

The heat-treatment of calcium hydroalumosilicate is conducted in rotary or electric furnaces at a temperature ranging from 250° to 600° C. The heat-treatment temperature is selected within the above-specified range depending on the composition of the starting hydroalumosilicate. The heat-treatment time is determined by the composition of the desired product, i.e. cement.

If the heat-treatment of hydroalumosilicate is conducted at a temperature below 250° C., the synthesis of chemically combined oxides in the predetermined ratio cannot be effected due to insufficient heating of the materials, while at a temperature above 600° C. there occurs decomposition of calcium hydroalumosilicate into oxides and anhydrous compounds. Such product cannot be used as a cement for the manufacture of cores and moulds. The heat-treatment at a temperature within the range of from 250° to 600° C. gives a cement containing the following amounts of chemically combined oxides, percent by mass: CaO, 50 to 60; $Al_2O_3$, 28 to 37; $Fe_2O_3$, 0.01 to 1; $SiO_2$, 0.1 to 8; $Na_2O$, 0.1 to 1; $K_2O$, 0.1 to 0.5; $H_2O$, 3 to 12.

In addition to the above-mentioned product, the cement may also contain, in percent by mass: calcium oxide or calcium hydroxide, 1 to 10; calcium carbonate, 1 to 50; calcium carboaluminate, 1 to 30.

The sintered product obtained from the heat-treatment is subjected to disintegration in a mill to produce a powder containing 85–99% by mass of a fraction with a particle size of below 80 μm and 1–15% by mass of a fraction with a particle size of from 80 to 200 μm.

The resulting powder is a cement suitable for the manufacture of cores and moulds in foundry engineering.

Self-hardening mixtures based on the thus-produced cement are prepared by mixing thereof with sand and surfactant additives.

The following represents the physico-mechanical properties of moulding sands

| life time of a sand, minutes | 1 to 60 |
|---|---|
| compression strength, MPa: | |
| after 1.5 hours | 0.3 to 0.6 |
| after 3 hours | 0.6 to 1.0 |
| after 24 hours | 1.5 to 2.0 |
| residual strength after calcination, MPa: | |
| at 600° C. | to 0.30 |
| at 900° C. | to 0.15 |
| at 1,100° C. | 0.1 to 0.40 |
| at 1,250° C. | 1.5 to 4.5 |
| shattering (surface strength) of samples after hardening for 24 hours, % | 0.05 to 0.2 |
| gas-permeability, units | 150 to 180 |
| toxic exhausts in the manufacture of moulds and casting them with a metal | none. |

Therefore, the cement for the manufacture of cores and moulds according to the present invention ensures a good strength within 1.5 to 3 hours of hardening and has adjustable life time limits.

For a better understanding of the present invention, some specific examples illustrating particular embodiments of the method for preparing the cement and basic physicomechanical properties thereof are given below.

Examples 1 to 4 illustrate the preparation of the cement and its characteristics; Example 5 shows the use of the cement for the manufacture of cores and moulds. Example 6 illustrates the preparation of moulding sands with a known cement; it is given to demonstrate the advantages of the novel cement according to the present invention.

EXAMPLE 1

Sodium aluminate is mixed with calcium oxide in the weight ratio of 1.5:1 and treated with an aqueous solution of sodium carbonate with the concentration of 3.5% by mass at the temperature of 95° C. until 100% of calcium hydroalumosilicate containing the following oxides, percent by mass: CaO, 44.41; $Al_2O_3$, 26.75; $Fe_2O_3$, 0.01; $SiO_2$, 0.16; $Na_2O$, 0.1; $K_2O$, 0.1; $H_2O$, 28.47; are accumulated in the solid phase. The resulting hydroalumosilicate is washed on filters to remove alkalis and subjected to a heat-treatment at 250°–300° C. for 10 hours. As a result, a white product is obtained which is disintegrated to give a fraction with a particle size of below 80 μm in the amount of 85% by mass and a fraction with a particle size of from 80 to 200 μm in the amount of 15% by mass. Therefore, a cement is obtained which has the following composition, percent by mass: CaO. 55.63; Al$_2$O$_3$, 33.52; Fe$_2$O$_3$, 0.01; SiO$_2$, 0.20; Na$_2$O, 0.12; K$_2$O, 0.12; H$_2$O, 10.4; wherein these oxides are chemically combined with one another. The resulting cement is mixed with an aqueous solution of sulphite-alcohol lye to obtain a slurry of a normal consistency. The time of setting of the cement slurry and sample are made for the determination of strength characteristics. The samples are maintained in the air and tested after 1 and 3 days for compression strength.

The main results obtained in the tests are as follows:

| setting time; | |
| --- | --- |
| beginning | 5 minutes |
| end | 10 minutes |
| compression strength, MPa | |
| after 1 day | 13.0 |
| after 3 days | 15.0. |

EXAMPLE 2

An aluminate solution containing 80 g/l of Al$_2$O$_3$ and 0.3 g/l of SiO$_2$ is treated at 75° C. with calcium hydroxide for 4 hours. The resulting solid phase is separated on a filter and washed. The thus-produced calcium hydroalumosilicate has the following content of oxides, percent by mass: CaO, 43.08; Al$_2$O$_3$, 24.23; Fe$_2$O$_3$, 0.68; SiO$_2$, 7.69; Na$_2$O, 0.89; K$_2$O, 0.35; H$_2$O, 23.08. This calcium hydroalumosilicate is charged into a rotary kiln and calcined at 550°–600° C. for 2 hours. As a result, white granules are obtained which are disintegrated to give a fraction with a particle size of below 80 μm in the amount of 99% by mass and a fraction with a particle size of from 80 to 200 μm in the amount of 1% by mass. In this manner a cement is obtained which has the following composition, percent by mass: CaO, 50.58; Al$_2$O$_3$, 28.46; Fe$_2$O$_3$, 0.80; SiO$_2$, 9.03; Na$_2$O, 1.04; K$_2$O, 0.39; H$_2$O, 9.7; wherein these oxides are chemically combined with one another. The resulting cement is mixed with an aqueous solution of a sulphite-alcohol lye to obtain a slurry of a normal consistency. The setting time limits of the cement slurry are determined and samples for the measurement of strength characteristics are made. The samples are hardened and tested in a manner similar to that described in Example 1.

The basic test results are the following:

| setting time limits, minutes: | |
| --- | --- |
| beginning | 6 |
| end | 13 |
| compression strength, MPa: | |
| after 1 day | 12.0 |
| after 3 days | 14.0. |

EXAMPLE 3

Calcium hydroalumosilicate is prepared in a manner similar to that described in Example 1. Calcium hydroalumosilicate containing, percent by mass: CaO, 43.89; Al$_2$O$_3$, 25.64; Fe$_2$O$_3$, 0.37; SiO$_2$, 3.13; Na$_2$O, 0.35; K$_2$O, 0.28; H$_2$O, 26.33 is charged into an electric furnace. It is added with 5% by mass of calcium hydroxide. The heat-treatment is conducted for 6 hours at a temperature of 400°–450° C. The resulting product of the heat-treatment comprises a white pelletized material which is disintegrated to give fraction with a particle size of below 80 μm—90% by mass and with a particle size of from 80 to 200 μm—10% by mass. In this manner a cement is obtained, wherein the content of chemically combined oxides is the following, percent by mass: CaO, 57.33; Al$_2$O$_3$, 33.48; Fe$_2$O$_3$, 0.48; SiO$_2$, 4.09; Na$_2$O, 0.46; K$_2$O, 0.36; H$_2$O, 3.8.

The preparation of samples and testing thereof are effected as described in Example 1.

The test results are the following;

| Setting time limits of the cement, minutes: | |
| --- | --- |
| beginning | 15 |
| end | 30 |
| Compression strength, MPa: | |
| after 1 day | 16.0 |
| after 3 days | 18.0. |

EXAMPLE 4

An aluminate solution containing 80 g/l of Al$_2$O$_3$ and 0.1 g/l of SiO$_2$ is treated with calcium hydroxide for one hour at 95° C. In addition to hydroalumosilicate being present in the amount of 20% by mass and having the following content of oxides, percent by mass: CaO, 44.41; Al$_2$O$_3$, 26.75; Fe$_2$O$_3$, 0.01; SiO$_2$, 0.16; Na$_2$O, 0.1; K$_2$O, 0.1; H$_2$O, 28.47; calcium oxide and and calcium, as well as calcium carbonate and calcium hydrocarboaluminate.

The obtained solid phase is subjected to a heat-treatment in a rotary kiln at a temperature of 350°–400° C. for 1 to 1.5 hours. As a result, granules are obtained which are disintegrated into a fraction with a particle size of below 80 μm in the amount of 95% by mass and a fraction with a particle side of from 80 to 200 μm in the amount of 5% by mass. In this manner a cement is produced which has the following composition of chemically combined oxides, percent by mass: CaO, 55.63; Al$_2$O$_3$, 33.52; Fe$_2$O$_3$, 0.01; SiO$_2$, 0.20; Na$_2$O, 0.12; K$_2$O, 0.12; H$_2$O, 10.4; while the content of additives is the following, percent by mass: calcium oxide, 4.5; calcium hydroxide, 5.5; calcium carbonate, 45; and calcium carboaluminate, 35. In this cement the content of chemically combined oxides is 20% by mass, while the remaining 80% by mass are constituted by the above-mentioned additives.

The preparation of samples and testing thereof are effected as described in Example 1.

The test results are as follows:

| Time limits of the cement setting, minutes: | |
| --- | --- |
| beginning | 17 |
| end | 35 |
| Compression strength, MPa: | |
| after one day | 12.5 |
| after 3 days | 16.5 |

EXAMPLE 5

The cement prepared according to Example 1 in the amount of 5% by mass is mixed with a refractory aggregate, water and a surfactant. From the resulting mixture samples are made in an impact machine and subjected to the following tests:

(1) Compression strength, MPa:

| after 1.5 hours | 0.4 to 0.6 |
| --- | --- |
| after 3 hours | 0.6 to 1.0 |

| | |
|---|---|
| after 24 hours | 1.8 to 2.0 |

(2) Life time is varied within the range of from 1 to 60 minutes.
(3) Residual strength in MPa which characterizes knocking-out ability of the moulding sand, after calcination at the temperature:

| | |
|---|---|
| 600° C. | 0 to 0.30 |
| 900° C. | 0 to 0.15 |
| 1,100° C. | 0.1 to 0.40 |
| 1,250° C. | 1.5 to 4.5 |

(4) Shattering, 24 hours after hardening, %: 0.05 to 0.20
(5) Gas permeability: 150 to 180 units.
(6) Evolution of toxic compounds in the manufacture of moulds and casting: none.

EXAMPLE 6

Natural moulding sand is intermixed with 10% by mass of Portland cement and water. From the resulting mixture samples with the diameter of 50 mm and height of 50 mm are produced in an impact machine. The samples are tested for:
(1) Compression strength, MPa:

| | |
|---|---|
| after 1.5 hours | 0.1 to 0.3 |
| after 3.0 hours | 0.3 to 0.5 |
| after 24 hours | 1.5 to 1.7 |

(2) Life time: 30 to 45 minutes
(3) Residual strength after calcination, MPa, at the temperature:

| | |
|---|---|
| 600° C. | 2 to 4 |
| 900° C. | 9 to 10 |
| 1,100° C.) | 10 to 12 |
| 1,250° C.) | 12 to 15. |

(4) Shattering after 24 hours, %: 0.15 to 0.30
(5) Gas permeability: 100 to 125 units.

Thus, the cement according to the present invention, as compared to Portland cement, ensures a mechanical strength of samples which is 2–3 times higher during the first hours after their manufacture. At the same time, shattering of samples occurs 2–3 times less, while has a permability 1.5 times higher.

An especially valuable property of the cement according to the present invention is softening of samples. Thus, at 600°–900° C. a residual strength of samples is 0–0.3 MPa i.e. after casting of moulds with metal they are spontaneously pouring out by 50–75% on a knock-out grid.

The residual strength of samples based on Portland cement at the same temperatures is 2–10 MPa, i.e. substantially higher than that of samples based on the cement according to the present invention. This causes considerable difficulties in cleaning of castings from the moulding mass.

What is claimed is:

1. A cement for the manufacture of cores and moulds containing chemically combined oxides, with the following percent by weight: CaO, 50 to 60; $Al_2O_3$, 28 to 37; $Fe_2O_3$, 0.01 to 1; $SiO_2$, 0.1 to 8; $Na_2O$, 0.1 to 1; $K_2O$, 0.1 to 0.5; $H_2O$, 3 to 12; and having the following grain-size distribution: 85 to 99% by weight of a fraction with a particle size below 80 μm and 1 to 15% by weight of a fraction with a particle size of from 80 to 200 μm.

2. A method for preparing a cement according to claim 1, comprising heat-treating calcium hydroalumosilicate containing at most 8% by weight of $SiO_2$ at a temperature within the range of from 250° to 600° C., disintegrating the heat-treated product to obtain a fraction with a particle size of below 80 μm in an amount of 85 to 99% by weight and a fraction with a particle size of from 80 to 200 μm in an amount of from 1 to 15% by weight.

3. A method according to claim 2, wherein the heat-treatment of calcium hydroalumosilicate is carried out in the presence of at least one additive selected from the group consisting of calcium oxide, calcium hydroxide, calcium carbonate and calcium hydrocarboaluminate.

4. A method according to claim 3, wherein the additive is at least one member selected from the group consisting of calcium oxide and calcium hydroxide introduced in an amount of from 1 to 10% by weight, calcium carbonate in an amount of 1 to 50% by weight calcium hydrocarboaluminate in an amount of from 1.5 to 30% by weight.

* * * * *